United States Patent
Han

(10) Patent No.: US 8,423,282 B2
(45) Date of Patent: Apr. 16, 2013

(54) ROAD GUIDANCE SERVICE METHOD AND NAVIGATION SYSTEM FOR IMPLEMENTING THE METHOD

(75) Inventor: Dongsoo Han, Daejeon (KR)

(73) Assignees: Visoft Ltd., Daejeon (KR); V.I. Land Co., Ltd., Seoul (KR)

( * ) Notice: Subject to any disclaimer, the term of this patent is extended or adjusted under 35 U.S.C. 154(b) by 694 days.

(21) Appl. No.: 12/625,060

(22) Filed: Nov. 24, 2009

(65) Prior Publication Data

US 2010/0161212 A1 Jun. 24, 2010

(51) Int. Cl.
 *G08G 1/123* (2006.01)
(52) U.S. Cl.
 USPC .......................................... 701/400; 382/104
(58) Field of Classification Search .................. 701/400, 701/408, 409, 418, 420, 426, 436–439, 446, 701/454, 459; 707/E17.019, E17.11, E17.018; 382/104, 190, 195, 201, 206; 340/990, 995.1
See application file for complete search history.

(56) References Cited

U.S. PATENT DOCUMENTS

| | | | |
|---|---|---|---|
| 7,135,993 B2 * | 11/2006 | Okamoto et al. | 340/995.1 |
| 7,818,124 B2 * | 10/2010 | Herbst et al. | 701/439 |
| 7,920,072 B2 * | 4/2011 | Smith et al. | 340/995.1 |
| 2007/0078596 A1 * | 4/2007 | Grace | 701/209 |

FOREIGN PATENT DOCUMENTS

| | | |
|---|---|---|
| JP | 1997-178497 | 7/1997 |
| JP | 2003-344093 | 12/2003 |
| KR | 10-2000-0013568 | 3/2000 |
| KR | 20-2000-0017125 | 9/2000 |

* cited by examiner

*Primary Examiner* — Dalena Tran
(74) *Attorney, Agent, or Firm* — Lowe Hauptman Ham & Berner, LLP

(57) ABSTRACT

A method of providing a route guidance service and a navigation system for performing the method are provided. The method of providing a route guidance service includes: extracting outdoor advertisement information and advertisement production and installation information, which correspond to destination information entered by a user, from an outdoor advertisement database; generating virtual building image information using the extracted advertisement production and installation information; generating first navigation information by combining the generated building image information with the extracted outdoor advertisement information and advertisement production and installation information; and providing a route guidance service to the destination information using the first navigation information.

20 Claims, 4 Drawing Sheets

ROAD GUIDANCE SERVICE METHOD AND NAVIGATION SYSTEM FOR IMPLEMENTING THE METHOD

CROSS REFERENCE TO RELATED APPLICATION

This application claims the priority of Korean Patent Application No. 10-2007-0050513, filed on May 23, 2007 in the KIPO (Korean Intellectual Property Office), the disclosure of which are incorporated herein in their entirety by reference.

BACKGROUND

1. Field

The following description relates to a method of providing a route guidance service and a navigation system for the method.

2. Description of the Related Art

A navigation system typically uses a satellite to provide a route guidance service for a vehicle. The navigation system uses a global positioning system (GPS) receiver to receive a GPS signal from a GPS satellite for the purpose of determining present location. Based on location information, the navigation system may provide a user with the current location of his or her vehicle, calculate a route to a specified destination, and guide the user to the destination along is the route.

However, when a vehicle equipped with a conventional navigation system comes within a certain distance from a specified destination, the conventional navigation system typically terminates a voice announcement service after announcing that "You are near the destination. Voice announcement is terminated," since it does not have more detailed information about the destination. In this case, unless the destination is surrounded with buildings, the destination may be easily found when a driver approaches the destination. However, if the destination is located in a downtown area surrounded with high-rise buildings, it may be difficult for the driver to find the destination after the voice announcement service is terminated.

Additionally, the conventional navigation system does not provide parking information. Accordingly, if a driver is not informed of parking information, the driver may experience parking difficulties although the destination is easily found.

SUMMARY

The following description relates to a method and navigation system for providing a route guidance service, which uses outdoor advertisement information to accurately display destination information in a downtown area densely packed with high-rise buildings.

The following description further relates to a method and navigation system for providing a route guidance service, which uses outdoor advertisement information to graphically represent a building of interest at a specified destination or buildings near the destination.

The following description further relates to a method and navigation system for providing a route guidance service, which accurately applies outdoor advertisements attached to each floor of a building to virtual building image information.

The following description further relates to a method and navigation system for providing a route guidance service, which uses parking information related to outdoor advertisement information to inform a user of a parking lot at a specified destination.

The following description further relates to a method and navigation system for providing a route guidance service at a location near a specified destination.

The following description further relates to a method and navigation system for providing a route guidance service, which uses the name of outdoor advertisements together with the phone number or address of a specified destination when the destination is set.

Accordingly, in one general aspect, there is provided a method of providing a route guidance service including: extracting outdoor advertisement information and advertisement production and installation information, which correspond to destination information entered by a user, from an outdoor advertisement database; generating virtual building image information using the extracted advertisement production and installation information; generating first navigation information by combining the generated building image information with the extracted outdoor advertisement information and advertisement production and installation information; and providing a route guidance service to the destination information using the first navigation information.

In another general aspect, there is provided a navigation system including: an information extracting unit configured to extract outdoor advertisement information and advertisement production and installation information, which correspond to destination information entered by a user, from an outdoor advertisement database; an image generating unit configured to generate virtual building image information using the extracted advertisement production and installation information; an information combining unit configured to generate first navigation information by combining the generated building image information with the extracted outdoor advertisement information and advertisement production and installation information; and a route guiding unit configured to provide a route guidance service to the destination information using the first navigation information.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness. The following description with reference to the drawings provides illustrative examples of devices and methods according to embodiments of the invention. Such a description is for illustrative purposes only and not for purposes of limiting the same. Throughout the drawings and the detailed description, unless otherwise described, the same drawing reference numbers refer to the same elements, features, and structures.

A navigation system for performing a method of providing a route guidance service according to an exemplary embodiment of the present invention may make use of accumulated outdoor advertisement information to enhance a conventional navigation service. The navigation system may graphically display a navigation service by utilizing outdoor advertisement information attached to a high-rise building to apply a 3D display technique for displaying the navigation service.

Further, the navigation system may utilize the outdoor advertisement information to set a destination and guide a user to the destination. A conventional navigation system terminates a guidance service to a specified destination when a user comes within a certain distance from the destination. However, the navigation system according to an exemplary embodiment of the invention may utilize the outdoor advertisement information to provide more accurate display of the destination to the user when the user approaches the destination. In addition, when parking information is associated with the outdoor advertisement information, the navigation system may utilize the parking information for the user to park his or her vehicle.

Hereinafter, a method and system for providing a route guidance service according to an exemplary embodiment of the present invention will be described in detail with reference to the drawings.

Figure 1:
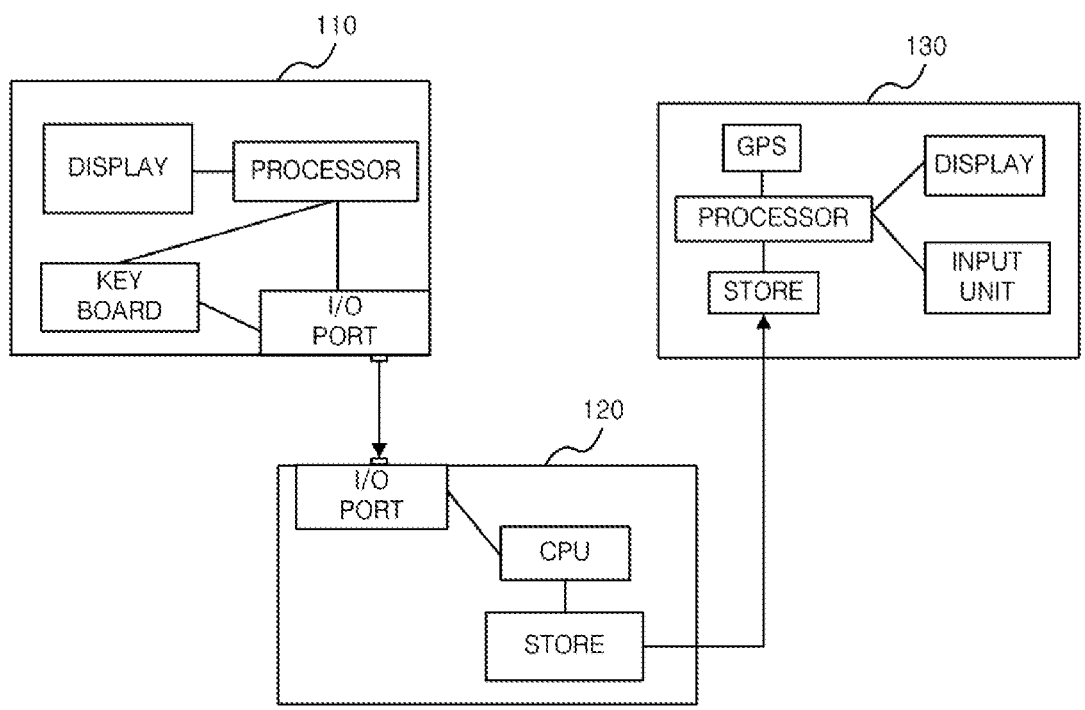
FIG. 1 is a block diagram illustrating a navigation system according to an exemplary embodiment of the present invention.

FIG. 1 is a block diagram illustrating a navigation system according to an exemplary embodiment of the present invention.

Referring to FIG. 1, an outdoor advertisement registering unit (hereinafter referred to as "OARU") 110 may receive information about outdoor advertisement and advertisement production and installation, and register the information with an outdoor advertisement database in a database server 120.

The OARU 110 may receive the information about outdoor advertisement and advertisement production and installation from a self-governing body via a user interface over the Internet. The OARU 110 may receive the information about outdoor advertisement and advertisement production and installation from an outdoor advertisement installation entity via the user interface over the Internet. The OARU 110 may receive the information about outdoor advertisement and advertisement production and installation in a combined manner of the two ways discussed above.

The OARU 110 may check if the information about outdoor advertisement and advertisement production and installation complies with outdoor advertisement rules of a self-governing body of a place where the outdoor advertisement is installed.

For example, the OARU 110 may refer to an outdoor advertisement rule database in a database server 120 to retrieve information about outdoor advertisement rules which corresponds to the information about outdoor advertisement and advertisement production and installation. If the information about outdoor advertisement rules corresponding to the information about outdoor advertisement and advertisement production and installation is stored in the outdoor advertisement rule database, the OARU 110 may determine that the information about outdoor advertisement and advertisement production and installation complies with the outdoor advertisement rules of the self-governing body. On the contrary, unless the information about outdoor advertisement rules is stored in the outdoor advertisement rule database, the OARU 110 may determine that the information about outdoor advertisement and advertisement production and installation does not comply with the outdoor advertisement rules of the self-governing body.

The outdoor advertisement rule database contains data regarding the outdoor advertisement rules which are classified into fields. Each field may include allowance information to be used in determining if outdoor advertisement is permitted. For example, the outdoor advertisement rule database may include a field of the size of outdoor advertisement and a field of the location of outdoor advertisement. The size field and the location field may include information about allowance of the size and about allowance of the location, respectively.

The OARU 110 may register the information about outdoor advertisement and the information about advertisement production and installation, which comply with the outdoor advertisement rules, with the outdoor advertisement rule database. That is, if the outdoor advertisement information and the advertisement production and installation information comply with the outdoor advertisement rules, the OARU 110 may register the outdoor advertisement information and the advertisement production and installation information with the outdoor advertisement database.

The OARU 110 may store the outdoor advertisement information and the advertisement production and installation information in the outdoor advertisement database in a format that is s easily extracted. For example, the OARU 110 may register the outdoor advertisement information and the advertisement production and installation information with the outdoor advertisement database in a relational database (RDB) format.

RDBs are based on a relational data model which uses a set of mathematical terms. The relational data model is a type of data configuration and is usually described as a table, which is organized into rows and columns. The relational data model utilizes an external concept relation of objects rather than their internal concept relation. Thus, the relational data model represents a relation between objects in terms of a correlation between data, instead of representing meaning of the objects.

On the other hand, unless the outdoor advertisement information and the advertisement production and installation information comply with the outdoor advertisement rule, the OARU 110 may consider the outdoor advertisement information and the advertisement production and installation information as illegal, and extract the illegal outdoor advertisement information. Accordingly, regulation of illegal outdoor advertisement may be performed quickly and accurately by means of the OARU 110.

The database server 120 may include an outdoor advertisement database, a building elevation database, and a map information database.

The outdoor advertisement database may store the outdoor advertisement information and the advertisement production and installation information therein. The outdoor advertisement information may include information about the size (length and breadth), content, material, lighting or the like of outdoor advertisement. The advertisement production and installation information may include information about a building where outdoor advertisement is installed, an entity which installs outdoor advertisements, an entity which produces outdoor advertisements, and the like. The information about a building where outdoor advertisements are installed may include information about the name, address, phone number, location, size, or number of stories of the building. The information about an entity installing outdoor advertisements may include information about the name, address, and phone number of the entity, floor on which outdoor advertisement is installed, installation type and installation location of the outdoor advertisement, or parking lot related to the entity.

The building elevation database may store building elevation information therein. The building elevation information may be generated using a building elevation which is maintained by a self-governing body. The map information database may store map information therein. The building elevation information and the map information are preferably associated with the outdoor advertisement information and the advertisement production and installation information.

A navigation system 130 may receive information related to the outdoor advertisement information from the database server 120 and provide an advanced route guidance service. That is, the navigation system 130 may provide a vehicle with a route guidance service by generating a stereoscopic image of buildings near a specified destination using a three-dimensional (3D) display technique and applying outdoor advertisement information associated with a building of interest to the building according to information about the floor and location of the destination (e.g., a company).

A navigation system for a route guidance service according to an exemplary embodiment of the invention will be described in detail with reference to FIGS. 2 and 3.

Figure 2:
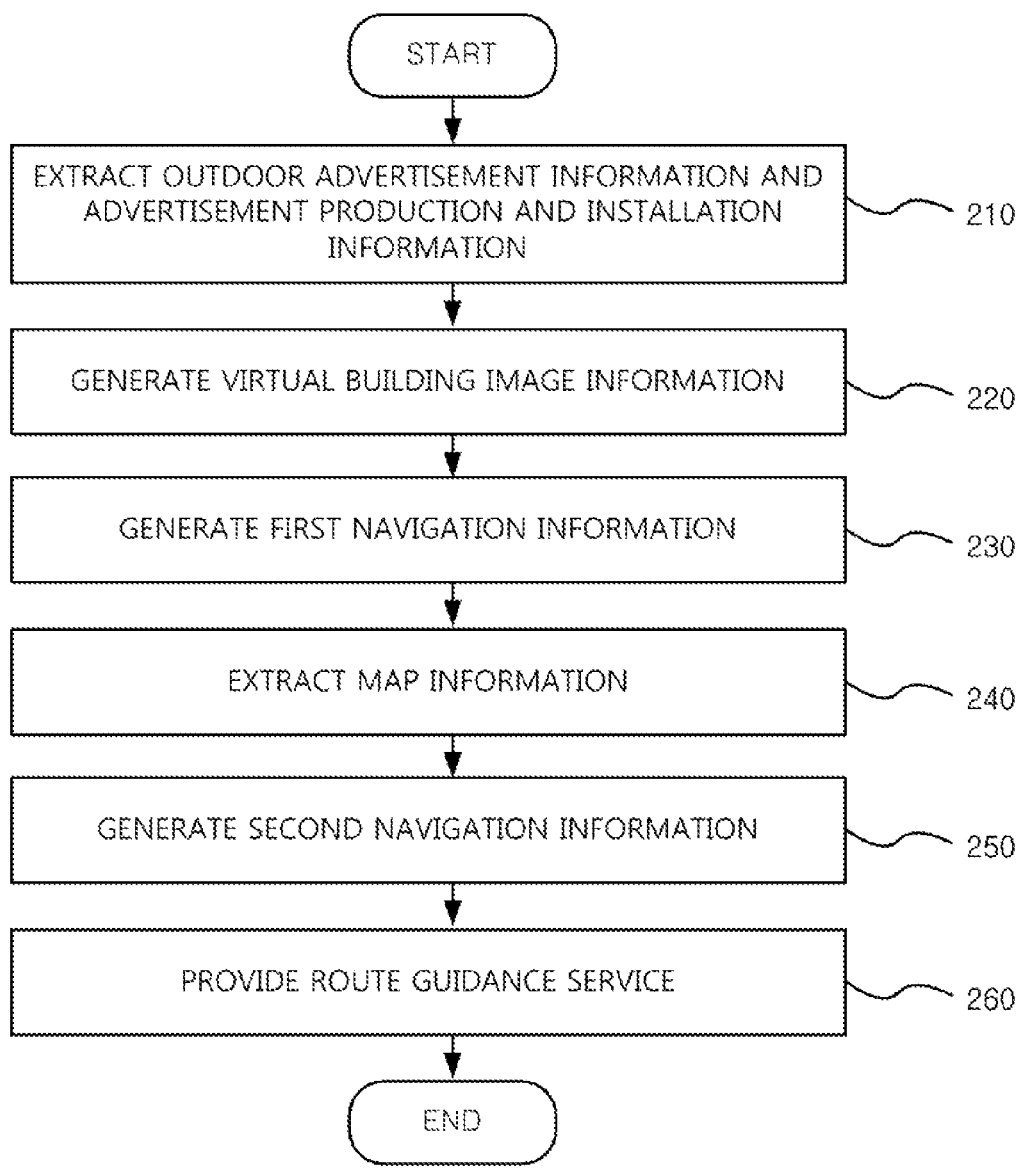
FIG. 2 is a flow chart of a method of providing a route guidance service according to an exemplary embodiment of the present invention.

FIG. 2 is a flow chart of a method of providing a route guidance service according to an exemplary embodiment of the present invention.

Referring to FIGS. 1 and 2, in operation 210, the navigation system 130 may extract outdoor advertisement information and advertisement production and installation information, which correspond to destination information entered by a user, from the outdoor advertisement database.

More specifically, the navigation system 130 may receive destination information from a user through an input unit. The input unit may be incorporated in the navigation system 130. The navigation system 130 may use the destination information to retrieve the outdoor advertisement information and the advertisement production and installation information from the outdoor advertisement database in the database server 120. When the outdoor advertisement information and the advertisement production and installation information which correspond to the destination information are retrieved from the outdoor advertisement database, the navigation system 130 may extract the outdoor advertisement information and the advertisement production and installation information from the database.

The outdoor advertisement information may include information about the size (length and breadth), content, material or lighting of outdoor advertisements. The advertisement production and installation information may include information about a building where outdoor advertisements are installed, an entity which installs outdoor advertisements, an entity which produces outdoor advertisements, and so on.

The information about an entity installing outdoor advertisements may include information about the name, address, and phone number of the entity, floor on which outdoor advertisement is installed, installation type and installation location of the outdoor advertisement, or parking lot related to the entity.

In operation 220, the navigation system 130 may generate virtual building image information using the extracted advertisement production and installation information. More specifically, the navigation system 130 may generate two-dimensional (2D) or three-dimensional (3D) building image information using the information about the building on which the outdoor advertisement is installed, which is one part of the advertisement production and installation information. In the current example, the navigation system 130 preferably generates the 3D building image information.

For example, the navigation system 130 may generate the building image information using information about the size and number of stories of a building on which outdoor advertisement is installed. Accordingly, the navigation system 130 may graphically generate first navigation information.

Alternatively, the navigation system 130 may extract building elevation information from the building elevation database using the advertisement production and installation information, and generate 2D or 3D building image information using the extracted building elevation information. In this case, the navigation system 130 may extract from the building elevation database the building elevation information corresponding to the information about the building on which the outdoor advertisement is installed, which is one part of the advertisement production and installation information.

The information about the building may include the name, address, phone number, location, size or number or stories of the building on which the outdoor advertisement is installed.

To generate the building image information using the building elevation information, for example, the navigation system 130 may extract information about the size, number of stories, etc. of the building from the building elevation information, and generate 2D or 3D building image information from the extracted information. As described above, in the current example, the navigation system 130 preferably generates 3D building image information.

On the other hand, when generating the 3D building image information from the building information, such as the information about the size, number of stories, etc. of the building, the navigation system 130 may be short of resources, such as central processing unit (CPU) cycles and memory, or hard disk capacity. In this case, the building image information may be generated by the central server. The central server is preferably external to the navigation system 130.

The central server may generate the building image information using the building information of the advertisement production and installation information. For example, the central server may generate the building image information using the information about the size, number of stories, etc. of the building on which the outdoor advertisement is installed.

Alternatively, the central server may extract the building elevation information from the building elevation database and generate the building image information using the extracted building elevation information. For example, the central server may generate the building image information using the information about the size, number of stories, etc. of the building from the building elevation information.

The central server may store the generated building image information in the building image database (not shown). The building image information may be stored in the building image database to be associated with the outdoor advertisement information and the advertisement production and installation information.

In operation 230, the navigation system 130 may generate first navigation information by combining the generated building image information with the extracted outdoor advertisement information and advertisement production and installation information. In other words, the navigation system 130 may retrieve location information, which corresponds to the outdoor advertisement installation entity information of the advertisement production and installation information, from the building image information, and apply the outdoor advertisement installation entity information and the outdoor advertisement information to the retrieved location information.

For example, the navigation system 130 may retrieve the location information in the building image information, which corresponds to the outdoor advertisement installation entity information, using information about an entity of interest (e.g., information about a floor on which an outdoor advertisement is installed, installation type and installation position of outdoor advertisements) which is located within the building. The navigation system 130 may generate the first navigation information by combining the outdoor advertisement installation entity information and the outdoor advertisement information with the retrieved location information. In this case, the navigation system 130 may select some of the outdoor advertisement installation entity information and outdoor advertisement information and combine the selected information with the building image information (i.e., the retrieved location information).

Alternatively, the navigation system 130 may not generate the building image information but instead may download predetermined building image information from the central server before or when information about the geography and buildings near a specified destination is needed, which will be described in detail with reference to FIG. 3.

Figure 3:
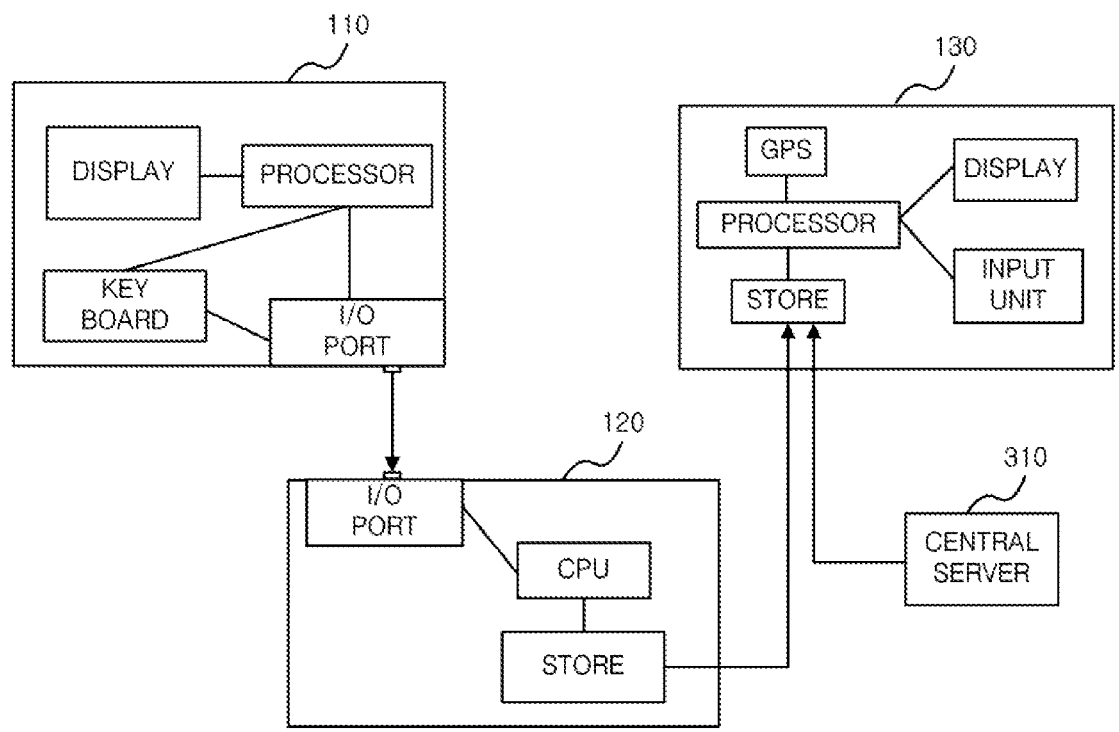
FIG. 3 is a view illustrating a process of generating first navigation information using building image information downloaded from a central server.

FIG. 3 is a view illustrating a process of generating first navigation information using building image information downloaded from a central server. Referring to FIG. 3, the navigation system 130 may send a download request signal to a central server 310 to download building image information. After receiving the download request signal, the central server 310 may retrieve the building image information corresponding to the download request signal from the building image database and send the building image information to the navigation system 130. The download request signal may include outdoor advertisement installation entity information, such as information about the size, location, number of stories, etc. of an outdoor advertisement installation entity.

The navigation system 130 may generate the first navigation information by downloading the transmitted building image information and combining it with the outdoor advertisement information and the advertisement production and installation information. The navigation system 130 may generate the first navigation information by retrieving a location in the building image information corresponding to the outdoor advertisement installation entity information and reflecting the outdoor advertisement installation entity information and the outdoor advertisement information on the retrieved location.

For example, the navigation system 130 may retrieve the location information in the building image information, which corresponds to the outdoor advertisement installation entity information, using information about an entity of interest (e.g., information about floor on which outdoor advertisement is installed, installation type and installation position of outdoor advertisement) which is located within the building. The navigation system 130 may generate the first navigation information by combining the outdoor advertisement installation entity information and the outdoor advertisement information with the retrieved location information. In this case, the navigation system 130 may select some or all of the outdoor advertisement installation entity information and outdoor advertisement information and combine the selected information with the building image information (the retrieved location information).

Accordingly, the navigation system 130 may graphically generate the first navigation information for a route guidance service by combining the outdoor advertisement information and the advertisement production and installation information with the building image information. Thus, a user may check buildings near a specified destination through the first navigation information before departure or arrival.

Reference numerals 110 and 120 denote an outdoor advertisement registering unit (OARU) and a database server, respectively, which have been described above.

Referring back to FIGS. 1 and 2, in operation 240, the navigation system 130 may extract map information associated with the outdoor advertisement information from the map information database. The navigation system 130 may retrieve the map information associated with the outdoor advertisement information from the map information database using the advertisement production and installation information. The navigation system 130 may extract the retrieved map information as the map information associated with the outdoor advertisement information.

For example, the navigation system 130 may retrieve map information associated with the outdoor advertisement information from the map information database using outdoor advertisement installation entity information, such as the name, address and phone number of an outdoor advertisement installation entity. The navigation system 130 may extract the retrieved map information as the map information associated with the outdoor advertisement information.

Alternatively, the navigation system 130 may extract map information associated with the outdoor advertisement information from the map information database using destination information entered by a user.

For example, the navigation system 130 may retrieve map information associated with the outdoor advertisement information from the map information database using information about the phone number and address of an outdoor advertisement installation entity, and the name of outdoor advertisement. The navigation system 130 may extract the retrieved map information as the map information associated with the outdoor advertisement information.

In operation 250, the navigation system 130 may generate second navigation information by integrating the extracted map information and the first navigation information. That is, the navigation system 130 may generate the second navigation information by integrating the map information associated with the outdoor advertisement information, and the first navigation information which is a combination of the building image information and the outdoor advertisement information and the advertisement production and installation information.

Accordingly, the navigation system 130 may provide an advanced route guidance service by generating the second navigation information which is a combination of the map information and the first navigation information.

In operation 260, the navigation system 130 may provide a user with a route guidance service to a specified destination using the second navigation information. That is, the navigation system 130 may provide a user with a route guidance service by displaying the second navigation information which is a combination of the first navigation information and the map information.

The navigation system 130 may provide a route guidance service in a conventional way at a location distant from the destination, and provide the route guidance service using the second navigation information at a location near the destination.

When a user approaches the destination, the navigation system 130 may highlight the outdoor advertisement information or the advertisement production and installation information which is combined with the building image information. For example, when a user comes within about 100 m from the destination, the navigation system 130 may highlight information about the name and phone number of an outdoor advertisement installation entity, content of outdoor advertisements and the like, which are combined with the building image information. Accordingly, the navigation system 130 may provide a user with a more accurate route guidance service.

On the other hand, the navigation system 130 may use the first navigation information to provide a user with a route guidance service.

The navigation system 130 may provide a route guidance service by means of voice announcement which is associated with the first and second navigation information. The following are examples of (1) conventional route guidance service and (2) route guidance service according to an exemplary embodiment of the invention:

(1) You are close to your destination. Voice announcement is terminated;

(2) You are close to your destination. Check computer graphic images of the vicinity surrounding the destination using the outdoor advertisement information. Check the highlighted outdoor advertisement and take route 'A' to the destination. You can park at parking lot 'B'.

As such, the navigation system 130 may provide a user with a graphical route guidance service with voice announcement so that the user may find the destination quickly and accurately.

The present invention can be implemented as computer readable codes in a computer readable medium. The computer readable recording medium may include a program instruction, a local data file, a local data structure, or a combination thereof. The computer readable recording medium may be specific to exemplary embodiments of the invention or commonly known to those of ordinary skill in computer software. The computer readable recording medium includes all types of recordable media in which computer readable data are stored. Examples of the computer readable recording medium include a magnetic medium, such as a hard disk, a floppy disk and a magnetic tape, an optical medium, such as a CD-ROM and a DVD, a magneto-optical medium, such as a floptical disk, and a hardware memory, such as a ROM, a RAM and a flash memory, specifically configured to store and execute program instructions. Further, the computer readable recording medium may be implemented in the form of a transmission medium, such as light, wire or waveguide, to transmit signals which designate program instructions, local data structures and the like. Examples of the program instruction include machine code, which is generated by a compiler, and a high level language, which is executed by a computer using an interpreter and so on.

Figure 4:
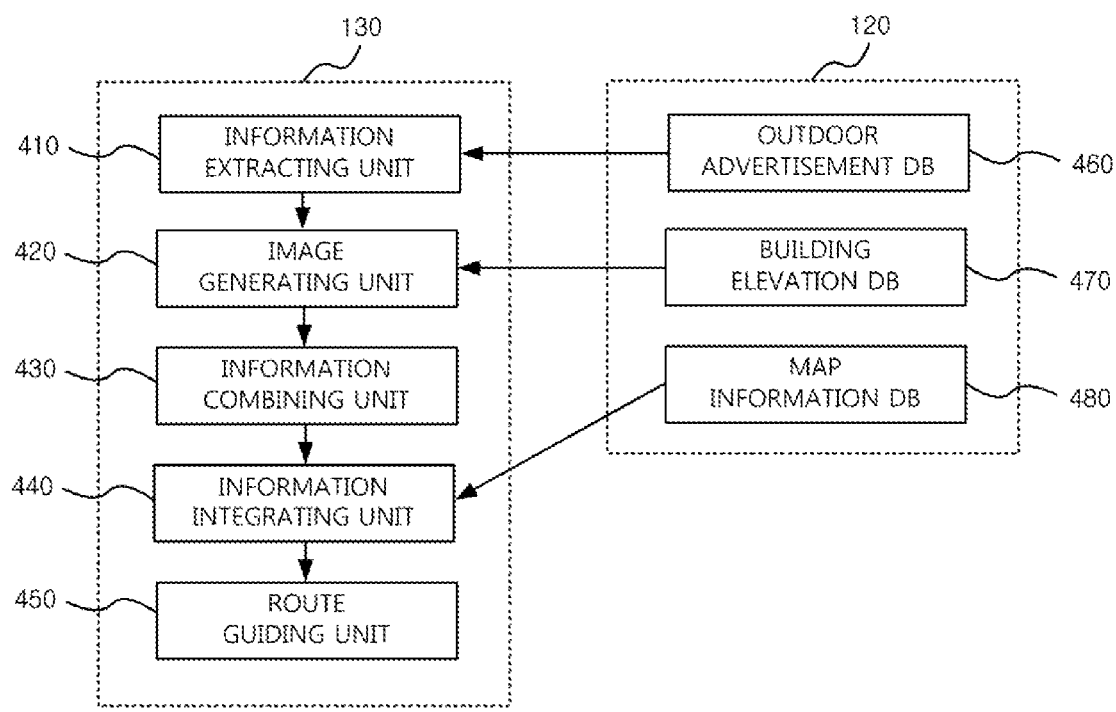
FIG. 4 is a block diagram of a navigation system according to an exemplary embodiment of the present invention.

FIG. 4 is a block diagram of a navigation system according to an exemplary embodiment of the present invention.

Referring to FIG. 4, which discloses hardware units used to provide the invention, the navigation system includes an information extracting unit 410, an image generating unit 420, an information combining unit 430, an information integrating unit 440, and a route guiding unit 450.

The information extracting unit 410 may extract outdoor advertisement information and advertisement production and installation information, which correspond to destination information entered by a user, from an outdoor advertisement database.

More specifically, the user may enter the destination information through an input unit. The destination information may include the name, phone number and address of an outdoor advertisement installation entity, and the name of outdoor advertisement. Further, the input unit may be incorporated into the navigation system 130.

The information extracting unit 410 may retrieve the outdoor advertisement information and the advertisement production and installation information from an outdoor advertisement database 460 in the database server 120 using the destination information. The information extracting unit 410 may extract the retrieved information as the outdoor advertisement information and the advertisement production and installation information, which correspond to the destination information.

The outdoor advertisement information may include the size (length and breadth), content, material or lighting of the outdoor advertisement. The advertisement production and installation information may include information about a building where outdoor advertisements are installed, an entity which installs outdoor advertisements, an entity which produces outdoor advertisements, and the like. The information about an entity installing outdoor advertisements may include information about the name, address, and phone number of the entity, floor on which outdoor advertisement is installed, installation type and installation location of the outdoor advertisement, or parking lot related to the entity.

The image generating unit 420 may generate virtual building image information using the extracted advertisement production and installation information. More specifically, the image generating unit 420 may generate 2D or 3D building image information using the building information in the advertisement production and installation information. In the current example, the image generating unit 420 preferably generates 3D building image information. For example, the image generating unit 420 may generate the building image information using the size and number of stories of the building. Accordingly, the image generating unit 420 may graphically generate first navigation information.

Alternatively, the image generating unit 420 may extract building elevation information from a building elevation database 470 in the database server 120 using the advertisement production and installation information, and generate 2D or 3D building image information using the extracted building elevation information. The image generating unit 420 may extract the building elevation information, which corresponds to the building information in the advertisement production and installation information, from the building elevation database.

The building information may include the name, address, phone number, location, size or number of stories of the building where the outdoor advertisement is installed.

The image generating unit 420 may extract the size and number of stories of the building from the building elevation information and generate 2D or 3D building image information using the extracted information. As described above, in the current example, the image generating unit 420 preferably generates 3D building image information.

On the other hand, when generating the 3D building image information from the building information, such as the information about the size, number of stories, etc. of the building, the navigation system 130 may be short of resources, such as central processing unit (CPU) cycles and memory, or hard disk capacity. In this case, the building image information may be generated by the central server. The central server is preferably external to the navigation system 130.

The central server may generate the building image information using the building information in the advertisement production and installation information. For example, the central server may generate the building image information using the information about the size, number of stories, etc. of the building on which the outdoor advertisement is installed.

Alternatively, the central server may extract the building elevation information from the building elevation database and generate the building image information using the extracted building elevation information. For example, the central server may generate the building image information using the information about the size, number of stories, etc. of the building from the building elevation information.

The central server may store the generated building image information in the building image database. The building image information may be stored in the building image database to be associated with the outdoor advertisement information and the advertisement production and installation information.

The information combining unit 430 may generate first navigation information by combining the generated building image information with the extracted outdoor advertisement information and advertisement production and installation information. In other words, the information combining unit 430 may retrieve location information, which corresponds to the outdoor advertisement installation entity information in the advertisement production and installation information, from the building image information, and apply the outdoor advertisement installation entity information and the outdoor advertisement information to the retrieved location information to generate the first navigation information.

For example, the information combining unit 430 may retrieve the location information in the building image information, which corresponds to the outdoor advertisement installation entity information, using information about an entity of interest (e.g., information about a floor on which outdoor advertisement is installed, installation type and installation position of outdoor advertisement) which is located within the building. The information combining unit 430 may generate the first navigation information by combining the outdoor advertisement installation entity information and the outdoor advertisement information with the retrieved location information. In this case, the information combining unit 430 may select some of the outdoor advertisement installation entity information and outdoor advertisement information and combine the selected information with the building image information (i.e., the retrieved location information).

Alternatively, the navigation system 130 may not generate the building image information but instead may download predetermined building image information from the central server before or when information about the geography and buildings near a specified destination is needed, which will be described in detail.

The information combining unit 430 may send a download request signal to the central server 310 through a communication unit (not shown) to download building image information. After receiving the download request signal, the central server 310 may retrieve the building image information corresponding to the download request signal from the building image database and send the building image information to the navigation system 130. The download request signal may include outdoor advertisement installation entity information, such as information about the size, location, number of stories, etc. of an outdoor advertisement installation entity.

The navigation system 130 may receive the building image information through the communication unit and send the building image information to the information combining unit 430. The information combining unit 430 may generate the first navigation information by combining the downloaded building image information with the outdoor advertisement information and the advertisement production and installation information.

The information combining unit 430 may retrieve location information corresponding to the outdoor advertisement installation entity information from the building image information. The information combining unit 430 may generate the first navigation information by applying the outdoor advertisement installation entity information and the outdoor advertisement information to the retrieved location information.

For example, the information combining unit 430 may retrieve the location information in the building image information, which corresponds to the outdoor advertisement installation entity information, using information about an entity of interest (e.g., information about a floor on which outdoor advertisement is installed, installation type and installation position of outdoor advertisement) which is located within the building. The information combining unit 430 may generate the first navigation information by combining the outdoor advertisement installation entity information and the outdoor advertisement information with the retrieved location information. In this case, the information combining unit 430 may select some or all of the outdoor advertisement installation entity information and outdoor advertisement information and combine the selected information with the building image information (i.e., the retrieved location information).

Accordingly, the navigation system 130 may graphically generate the first navigation information for a route guidance service by combining the outdoor advertisement information and the advertisement production and installation information with the building image information. Thus, a user may check buildings near the destination through the first navigation information before departure or arrival.

The information integrating unit 440 may extract map information associated with the outdoor advertisement information from a map information database 480 in the database server 120. The information integrating unit 440 may retrieve the map information associated with the outdoor advertisement information from the map information database 480 using the advertisement production and installation information. The information integrating unit 440 may extract the retrieved map information as the map information associated with the outdoor advertisement information.

For example, the information integrating unit 440 may retrieve map information associated with the outdoor advertisement information from the map information database 480 using outdoor advertisement installation entity information, such as the name, address and phone number of an outdoor advertisement installation entity. The information integrating unit 440 may extract the retrieved map information as the map information associated with the outdoor advertisement information.

Alternatively, the information integrating unit 440 may extract map information associated with the outdoor advertisement information from the map information database 480 using destination information entered by a user.

For example, the information integrating unit 440 may retrieve map information associated with the outdoor advertisement information from the map information database using information about the phone number and address of an outdoor advertisement installation entity, and the name of outdoor advertisement. The information integrating unit 440 may extract the retrieved map information as the map information associated with the outdoor advertisement information.

The information integrating unit 440 may generate second navigation information by integrating the extracted map information and the first navigation information. That is, the information integrating unit 440 may generate the second navigation information by integrating the map information associated with the outdoor advertisement information, and the first navigation information which is a combination of the building image information and the outdoor advertisement information and the advertisement production and installation information.

Accordingly, the information integrating unit 440 may provide an advanced route guidance service by generating the second navigation information which is a combination of the map information and the first navigation information.

The route guiding unit 450 may provide the user with a route guidance service to the destination using the second navigation information. That is, the route guiding unit 450 may provide the user with a route guidance service by displaying the second navigation information, which is a combination of the first navigation information and the map information, on a display (not shown).

The route guiding unit 450 may provide a route guidance service in a conventional way at a location distant from the destination, and provide the route guidance service using the second navigation information at a location near the destination.

When the user approaches the destination, the route guiding unit 450 may highlight the outdoor advertisement information or the advertisement production and installation information which is combined with the building image information. For example, when the user comes within about 100 m from the destination, the route guiding unit 450 may highlight information about the name and phone number of an outdoor advertisement installation entity, content of outdoor advertisement and the like, which are combined with the building image information. Accordingly, the route guiding unit 450 may provide the user with a more accurate route guidance service.

On the other hand, the route guiding unit 450 may use the first navigation information to provide the user with a route guidance service.

As apparent from the above description, it is possible to use outdoor advertisement information to accurately display destination information in a downtown area densely packed with high-rise buildings.

It is possible to use outdoor advertisement information to graphically represent a building of interest at a specified destination or buildings near the destination.

It is possible to accurately apply outdoor advertisements attached to each floor of a building to virtual building image information.

It is possible to use parking information related to outdoor advertisement information to inform a user of a parking lot at a specified destination.

It is possible to provide a route guidance service at a location near a specified destination.

It is possible to use the name of outdoor advertisement together with the phone number or address of a specified destination when the destination is set.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations fall within the scope of the following claims.

What is claimed is:

1. A method of providing a route guidance service by a navigation system including at least one processor, the method comprising:
   extracting outdoor advertisement information and advertisement production and installation information, which correspond to destination information entered by a user, from an outdoor advertisement database;
   generating virtual building image information using the extracted advertisement production and installation information;
   generating first navigation information by combining the generated building image information with the extracted outdoor advertisement information and advertisement production and installation information; and
   providing a route guidance service to the destination information using the first navigation information,
   wherein the outdoor advertisement database includes actual outdoor advertising information about outdoor advertisements which are actually installed.

2. The method of claim 1, wherein the advertisement production and installation information comprises building information about a building to which outdoor advertisements are installed, and wherein generating the building image information comprises generating two-dimensional (2D) or three-dimensional (3D) building image information using the building information about a building to which outdoor advertisements are installed.

3. The method of claim 2, wherein the building information about a building to which outdoor advertisements are installed comprises at least one of name, address, phone number, location, size and number of stories of a building on which outdoor advertisements are installed.

4. The method of claim 1, wherein generating the building image information comprises:
   extracting building elevation information from a building elevation database using the advertisement production and installation information; and
   generating 2D or 3D building image information using the building elevation information.

5. The method of claim 4, wherein the advertisement production and installation information comprises building information about a building to which outdoor advertisements are installed, and wherein extracting the building elevation information comprises extracting the building elevation information, which corresponds to the building information about a building to which outdoor advertisements are installed, from the building elevation database.

6. The method of claim 5, wherein the information about a building to which outdoor advertisements are installed comprises at least one of name, address, phone number, location, size and number of stories of a building on which outdoor advertisements are installed.

7. The method of claim 1, wherein if the building image information is generated in a central server, generating the first navigation information comprises:
   downloading the building image information from the central server upon receipt of a download request signal; and
   generating first navigation information by combining the downloaded building image information with the outdoor advertisement information and the advertisement production and installation information.

8. The method of claim 1, wherein the advertisement production and installation information comprises information about an outdoor advertisement installation entity, and wherein generating the first navigation information comprises:

retrieving a location in the building image information corresponding to the information about an outdoor advertisement installation entity; and applying the outdoor advertisement installation entity information and the outdoor advertisement information to the retrieved location to generate the first navigation information.

9. The method of claim 8, wherein the outdoor advertisement installation entity information comprises at least one of name, address and phone number of the outdoor advertisement installation entity, floor on which outdoor advertisement is installed, shape, size and location of installed outdoor advertisement, and parking lot associated with the outdoor advertisement installation entity, and the outdoor advertisement information comprises at least one of size (length and breadth), content, material and lighting of the outdoor advertisement.

10. The method of claim 1, further comprising extracting map information associated with the outdoor advertisement information from a map information database; and generating second navigation information by combining the extracted map information with the first navigation information, wherein providing the route guidance service comprises providing a route guidance service using the second navigation information.

11. The method of claim 1, wherein providing the route guidance service comprises highlighting outdoor advertisement information and advertisement production and installation information in the first navigation information to provide a route guidance service to the destination.

12. The method of claim 1, wherein the destination information comprises at least one of name, phone number and address of an outdoor advertisement installation entity, and name of outdoor advertisement.

13. A computer readable recording medium configured to record a program for executing the method according to claim 1 in a computer.

14. A navigation system comprising:

an information extracting unit configured to extract outdoor advertisement information and advertisement production and installation information, which correspond to destination information entered by a user, from an outdoor advertisement database;

an image generating unit configured to generate virtual building image information using the extracted advertisement production and installation information;

an information combining unit configured to generate first navigation information by combining the generated building image information with the extracted outdoor advertisement information and advertisement production and installation information; and a route guiding unit configured to provide a route guidance service to the destination information using the first navigation information, wherein the outdoor advertisement database includes actual outdoor advertising information about outdoor advertisements which are actually installed.

15. The navigation system of claim 14, wherein if the building image information is generated in a central server, the information combining unit generates first navigation information by downloading the building image information from the central server upon receipt of a download request signal and combining the downloaded building image information with the outdoor advertisement information and the advertisement production and installation information.

16. The navigation system of claim 14, wherein the advertisement production and installation information comprises information about an outdoor advertisement installation entity, and wherein the information combining unit retrieves a location in the building image information corresponding to the outdoor advertisement installation entity information, and generates the first navigation information by applying the outdoor advertisement installation entity information and the outdoor advertisement information to the retrieved location.

17. The navigation system of claim 16, wherein the outdoor advertisement installation entity information comprises at least one of name, address and phone number of the outdoor advertisement installation entity, floor on which outdoor advertisement is installed, shape, size and location of installed outdoor advertisement, and parking lot associated with the outdoor advertisement installation entity, and the outdoor advertisement information comprises at least one of size (length and breadth), content, material and lighting of the outdoor advertisement.

18. The navigation system of claim 14, further comprising an information integrating unit configured to extract map information associated with the outdoor advertisement information from a map information database, and generate second navigation information by combining the extracted map information with the first navigation information, wherein the route guiding unit provides a route guidance service using the second navigation information.

19. The navigation system of claim 14, wherein the route guiding unit highlights outdoor advertisement information and advertisement production and installation information in the first navigation information to provide a route guidance service to the destination.

20. The navigation system of claim 14, wherein the destination information comprises at least one of name, phone number and address of an outdoor advertisement installation entity, and name of outdoor advertisement.

* * * * *